United States Patent [19]

Kawamura et al.

[11] Patent Number: 5,385,463
[45] Date of Patent: Jan. 31, 1995

[54] CONTROL SYSTEM FOR CONTINUOUS VULCANIZATION LINE FOR MANUFACTURING SPONGE RUBBER PRODUCT

[75] Inventors: Takanori Kawamura, Chiba; Kibatsu Shinohara, Kanagawa, both of Japan

[73] Assignee: Kinugawa Rubber Ind. Co., Ltd., Chiba, Japan

[21] Appl. No.: 206,843

[22] Filed: Mar. 7, 1994

Related U.S. Application Data

[62] Division of Ser. No. 855,073, Mar. 23, 1992, Pat. No. 5,328,348.

[30] Foreign Application Priority Data

Mar. 29, 1991 [JP] Japan .................... 366179

[51] Int. Cl.⁶ .................................... B29C 35/10
[52] U.S. Cl. .................... 425/143; 264/40.6; 364/473; 364/476; 425/174.8 R
[58] Field of Search ............ 425/140, 141, 143, 174, 425/174.8 R; 264/40.1, 40.2, 40.6; 364/473, 476, 477

[56] References Cited

U.S. PATENT DOCUMENTS

| | | | |
|---|---|---|---|
| 3,597,794 | 8/1971 | Mann | 425/140 |
| 3,875,383 | 4/1975 | Somerville et al. | 425/141 X |
| 3,974,248 | 8/1976 | Atkinson | 425/141 X |
| 4,229,970 | 10/1980 | Barker et al. | 264/40.2 X |
| 4,514,812 | 4/1985 | Miller et al. | 364/473 |
| 4,585,603 | 4/1986 | Furuta et al. | 264/40.6 |
| 4,613,471 | 9/1986 | Harris | 264/40.1 |
| 4,767,300 | 8/1988 | Buja et al. | 425/140 |
| 4,832,885 | 5/1989 | Gross | 264/40.6 |
| 4,882,104 | 11/1989 | Dobrowsky | 364/473 X |
| 5,032,327 | 7/1991 | Becheret | 425/174.8 R X |
| 5,056,030 | 10/1991 | Tomita | 364/473 |
| 5,149,193 | 9/1992 | Faillace et al. | 425/143 X |

FOREIGN PATENT DOCUMENTS

| | | |
|---|---|---|
| 0013594 | 7/1980 | European Pat. Off. . |
| 0089060 | 9/1983 | European Pat. Off. . |
| 0347299 | 12/1989 | European Pat. Off. . |
| 2626134 | 7/1989 | France . |
| 2461720 | 7/1975 | Germany . |
| 565178 | 2/1981 | Japan . |
| 56-078963 | 6/1981 | Japan . |
| 59-155027 | 9/1984 | Japan . |
| 288213 | 3/1990 | Japan . |
| 2292015 | 12/1990 | Japan . |

*Primary Examiner*—Richard L. Chiesa
*Attorney, Agent, or Firm*—Bachman & LaPointe

[57] ABSTRACT

A control system for automatically controlling a continuous vulcanization line for manufacturing sponge rubber products, which includes a sensor for monitoring an outside dimension of a sponge rubber product produced by the continuous vulcanization line, a discriminating circuit for determining whether the monitored outside dimension is within a predetermined criterion defined by designated upper and lower limits of an acceptable rubber product, an arithmetic circuit for deriving an offset amount of the outside dimension, offsetting from the criterion, and a control circuit for controlling an output power of microwave generated by a microwave vulcanizer employed in a primary heating system for pre-foaming a sponge rubber material, depending on the offset amount of the outside dimension.

4 Claims, 5 Drawing Sheets

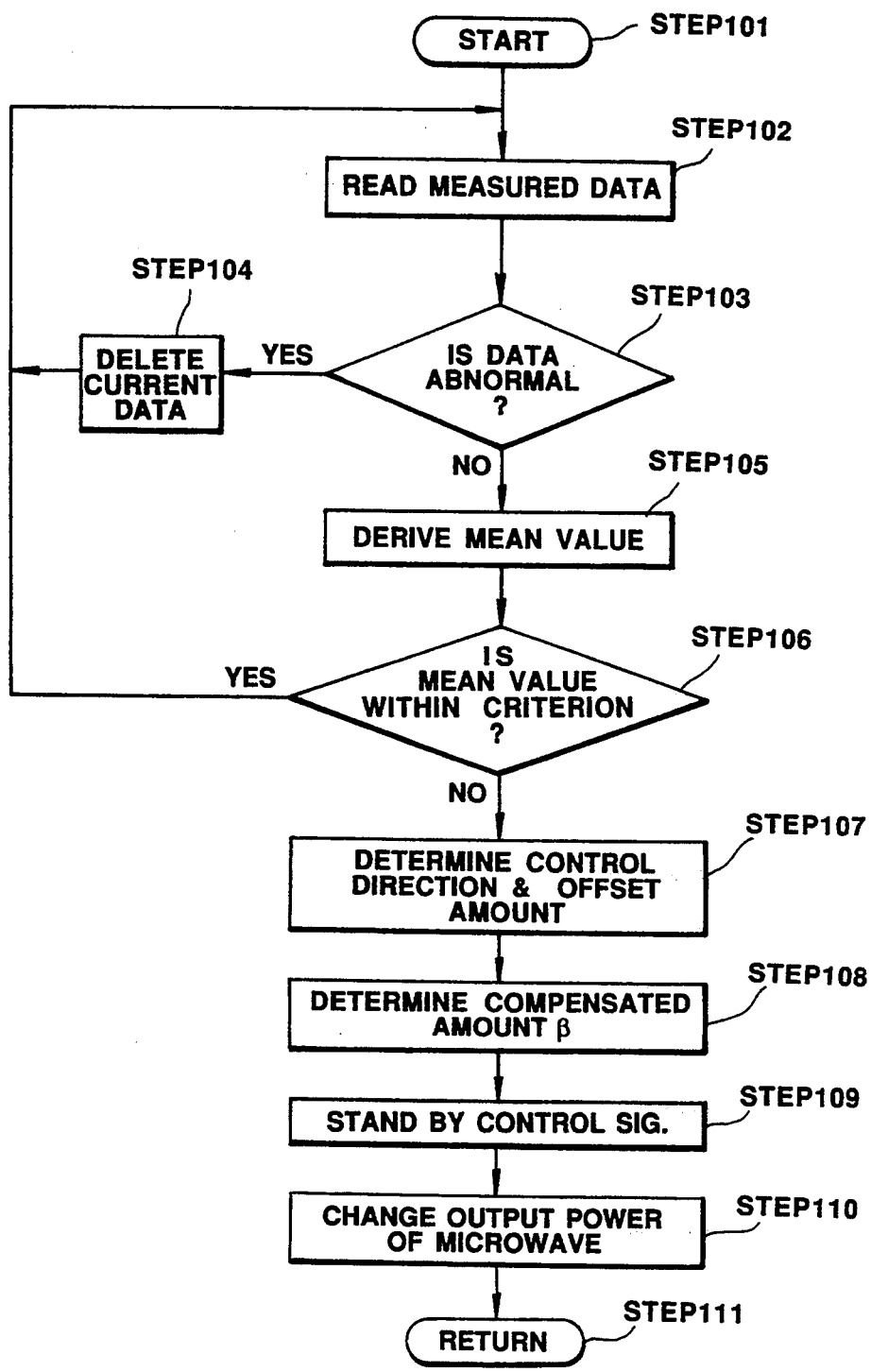

CONTROL SYSTEM FOR CONTINUOUS VULCANIZATION LINE FOR MANUFACTURING SPONGE RUBBER PRODUCT

This is a division of application Ser. No. 855,073, filed Mar. 23, 1992 now U.S. Pat. No. 5,328,348.

BACKGROUND OF THE INVENTION

1. Field of the Invention

The present invention relates to a control system for a continuous vulcanization line for rubber materials, such as unvulcanized sponge rubber materials including foaming agents, and specifically to an automatic control system which optimally controls the output power of microwave generated ,by a microwave vulcanizer employed in a continuous vulcanization utilized for manufacturing an extrusion-molded sponge rubber product suitable for weatherstrips, for example an automotive weatherstrip provided between a vehicular body and a door.

2. Description of the Prior Disclosure

Recently, there have been proposed and developed various continuous vulcanization lines for heating and foaming unvulcanized rubber materials, such as natural rubber, ethylene propylene rubber or the like. In general, the continuous vulcanization line comprises .an extruder for pre-forming a sponge rubber material by way of extrusion molding or pressing, a primary heating system including a hot-air vulcanizer for externally heating the pre-formed sponge rubber material and a microwave vulcanizer for internally heating the pre-formed sponge rubber material so as to pre-foam and pre-vulcanize the pre-formed rubber material, a secondary heating system, such as a hot-air vulcanizer or a hot-press vulcanizer for finally heating the pre-foamed rubber material, a cooling pool for cooling the finally vulcanized and foamed rubber material, and a plurality of roller conveyors provided in the manufacturing line, for conveying the sponge rubber product.

In such a conventional continuous vulcanization line for rubber materials, a desired outside dimension of the extrusion-molded and foamed sponge rubber product is manually adjusted so that the operator measures the outside dimension of the final product through a profile projector and manually changes the operating condition of the manufacturing line when the measured dimension does not satisfy a predetermined criterion based on an acceptable outside dimension of the extrusion-molded rubber product.

In another conventional continuous vulcanization line for manufacturing an extrusion-molded rubber hose having a simple, annular shape, an optical measuring device is provided for monitoring the change in an outside dimension of the rubber product, so as to automatically control a rotational speed of an extruding screw employed in an extruder and a rotational speed of a motor employed in a roller-conveyor. The extruding speed is varied depending on a vulcanizing speed of the rubber material. One such conventional continuous vulcanization line having a controller automatically controlling both an extruding speed and a final rubber product conveying speed, has been disclosed in Japanese Patent Second Publication (Tokko) Showa 56-5178.

In the former prior art, the manual adjustment of operating condition is troublesome. In addition, a considerably skilled operator is required for quickly and precisely adjusting the operating condition of the manufacturing line.

In the latter prior art, supposing that the rubber product has an extremely deformed, complicated cross-section, there is a possibility that the rubber product is locally deformed depending on both change in extruding speed and change in tension based on a roller-speed change of the roller conveyor, during operation of the controller which varies both speeds, namely the extruding speed and the conveying speed when the outside dimension measured by the optical measuring device does not satisfy the criterion.

SUMMARY OF THE INVENTION

It is, therefore in view of the above disadvantages, an object of the present invention to provide an automatic control system for a continuous vulcanization line for sponge rubber materials which can reliably provide an acceptable outside dimension of sponge rubber product, irrespective of the amount of skill of the operator.

It is another object of the invention to provide an automatic control system for a continuous vulcanization line for rubber materials which can continuously provide an acceptable outside dimension of sponge rubber product without changing a working speed of the line.

It is a further object of the invention to provide a controller for automatically controlling a continuous vulcanization line, such that the outside dimension of a sponge rubber product is automatically kept within a predetermined criterion defined by designated upper and lower limits.

In order to accomplish the aforementioned and other objects, a control system for automatically controlling a continuous vulcanization line for sponge rubber materials comprises sensor means for monitoring a controlled variable correlating to an outside dimension of a sponge rubber product produced by said continuous vulcanization line, discrimination means for determining whether said controlled variable is within a predetermined criterion defined by designated upper and lower limits of an acceptable sponge rubber product, arithmetic means for deriving an offset amount of said controlled variable, offsetting from said criterion, to generate an offset amount indicative signal, and control means for controlling an output power of microwave generated by a microwave generating means for internally heating a sponge rubber material, in response to offset amount indicative signal generated from said arithmetic means.

According to another aspect of the invention, a control system for automatically controlling a continuous vulcanization line for sponge rubber materials comprises sensor means for monitoring outside dimension of a sponge rubber product produced by the continuous vulcanization line, discrimination means for determining whether the monitored outside dimension is within a predetermined criterion defined by designated upper and lower limits of an acceptable sponge rubber product, arithmetic means for deriving an offset amount of the outside dimension, offsetting from the criterion, to generate an offset amount indicative signal, and control means for controlling an output power of microwave generated by a microwave generating means employed in a heating system for heating a rubber material, in response to the offset amount indicative signal generated from the arithmetic means. The control system may further comprise inhibiting means for inhibiting a new control operation of the control means until a desired time interval is elapsed. The desired time interval is determined on the basis of a working speed of the continuous vulcanization line and a distance between the sensor means and the microwave generating means in such a manner as to divide the distance by the working speed and in addition to a predetermined constant value to the divided value. The microwave generating means is comprised of a microwave vulcanizer for internally heating the rubber material. Preferably, the sensor means is an optical measuring device. The control means controls the output power of microwave such that the output power is linearly increased in proportion to the offset amount when the monitored outside dimension is less than the lower limit and the output power is linearly decreased in proportion to the offset amount when the monitored outside dimension exceeds the upper limit. The discrimination means may include a first circuit for discriminating whether the monitored outside dimension data is within a preset abnormal, outlying value range or within a preset normal value range, and a second circuit for deriving a mean value of a designated number of consecutively monitored normal outside dimension data when the number of the consecutively monitored normal outside dimension data reaches the designated number, so as to prevent malfunction of the control system. It is preferable that the arithmetic means compares the mean value with the upper and lower limits so as to derive the offset amount of the outside dimension, offsetting from the criterion, so as to provide a high accuracy of the control.

According to a further aspect of the invention, a control system for automatically controlling a continuous vulcanization line for sponge rubber materials comprises sensor means for monitoring a temperature in a heating system for heating a sponge rubber material, discrimination means for determining whether the monitored temperature is within a predetermined criterion defined by designated upper and lower temperature limits whose limits correlate to upper and lower limits of an acceptable outside dimension of a sponge rubber product, arithmetic means for deriving an offset temperature of the monitored temperature, offsetting from the criterion, to generate an offset temperature indicative signal, and control means for controlling an output power of microwave generated by a microwave generating means employed in the heating system, in response to the offset temperature indicative signal generated from the arithmetic means. The control means controls the output power of microwave such that the output power is linearly increased in proportion to the offset temperature when the monitored temperature is less than the lower temperature limit and the output power is linearly decreased in proportion to the offset temperature when the monitored temperature exceeds the upper temperature limit.

BRIEF DESCRIPTION OF THE DRAWINGS

FIG. 5 is a flow chart illustrating a control procedure of the controller of the second embodiment.

DESCRIPTION OF THE PREFERRED EMBODIMENTS

Figure 1:
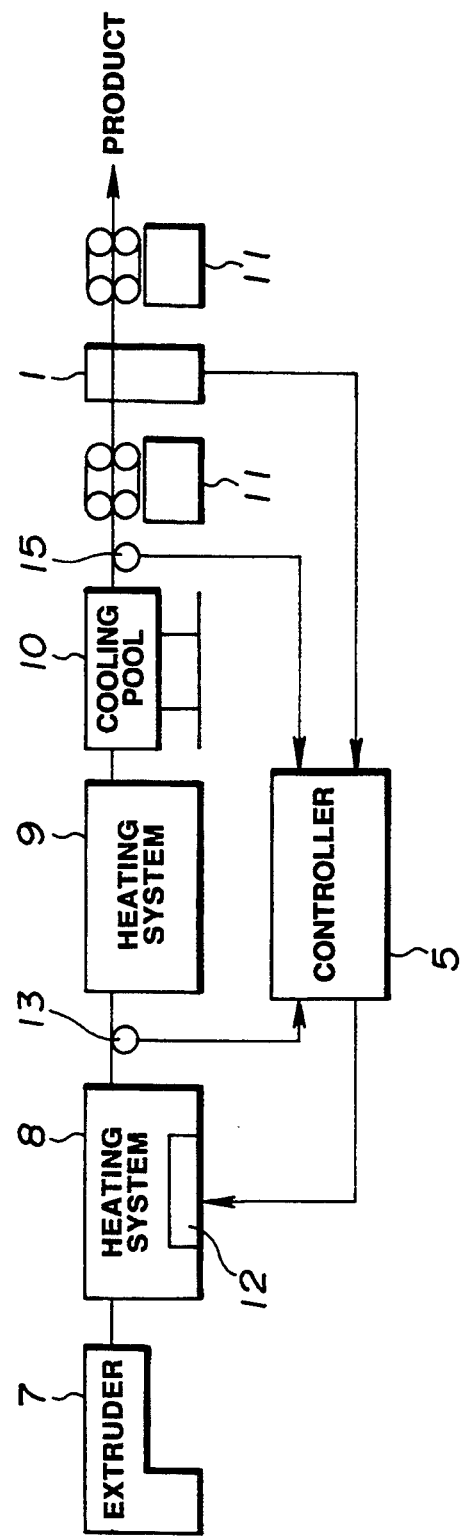
FIG. 1 is a schematic block diagram illustrating a continuous vulcanization line for manufacturing an extrusion-molded sponge rubber product, which line is automatically controlled by a controller of a first embodiment according to the invention.
Figure 2:
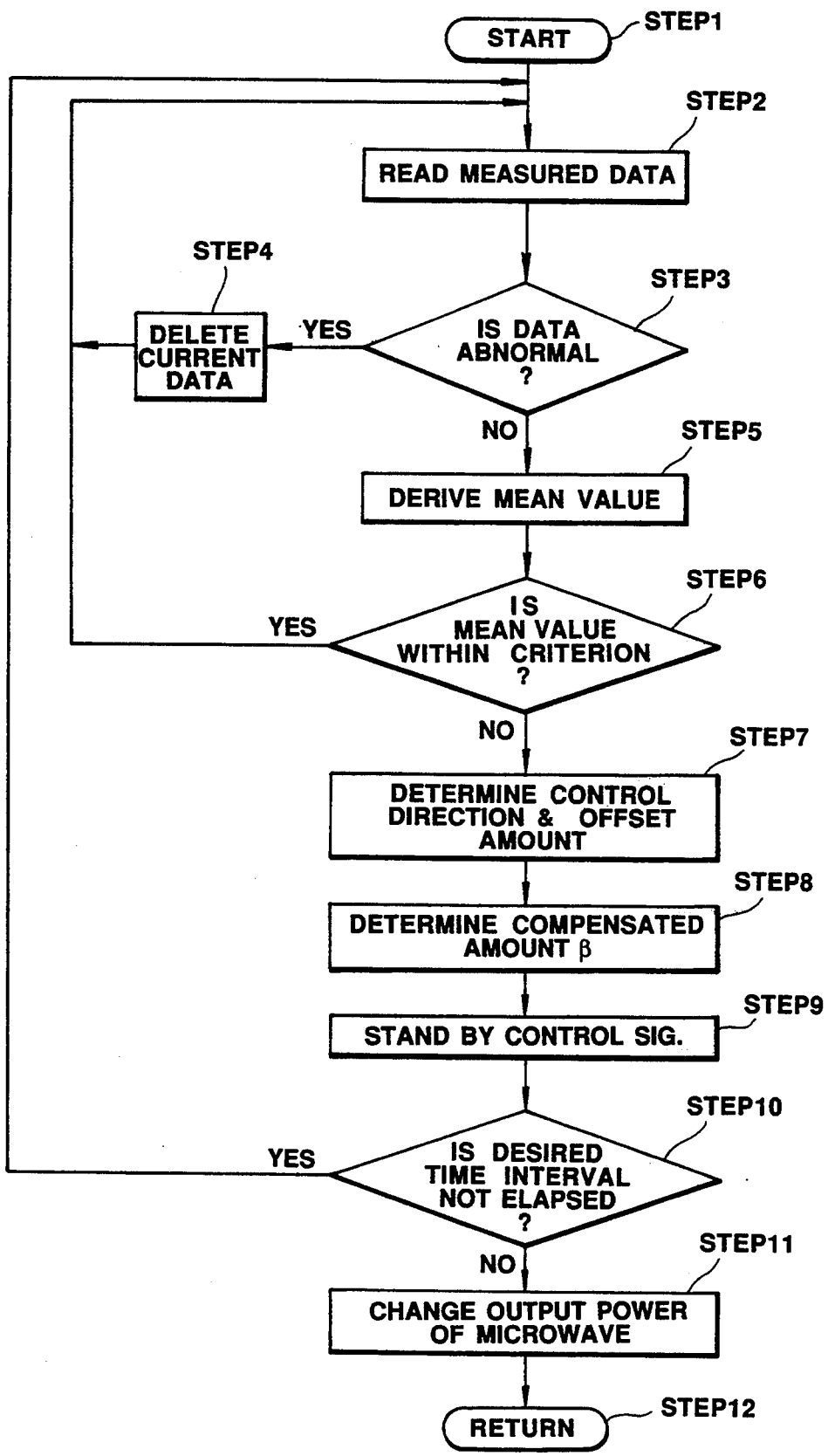
FIG. 2 is a flow chart illustrating a control procedure of the controller of the first embodiment.

In the first embodiment:

Referring now to FIG. 1, there is shown an extrusion-molded sponge rubber product manufacturing line. The line is generally utilized for manufacturing rubber products, such as an extrusion-molded sponge rubber product or a multiple extrusion-molded sponge rubber product partially formed with a sponge rubber portion, for example an automotive weatherstrip. The continuous vulcanization line comprises an extruder 7 for pre-forming a sponge rubber material by way of extrusion molding or pressing, a primary heating system 8 including a hot-air vulcanizer for externally heating the pre-formed rubber material and a microwave vulcanizer 12 for internally heating the pre-formed rubber material, a secondary heating system 9, such as a hot-air vulcanizer or a hot-press vulcanizer for finally heating the pre-foamed rubber material foamed through the primary heating system 8, a cooling pool 10 for cooling the finally vulcanized and foamed rubber material, and first and second roller conveyors 11 provided in the vicinity of the outlet of the line, for conveying the extrusion-molded sponge rubber product. As clearly, shown in FIG. 1, the controller 5 according to the invention is provided for automatically keeping the outside dimension of the rubber product within a predetermined criterion defined by designated upper and lower limits. The input terminals of the controller, 5 are connected to a first travel-speed detector 13 for monitoring a first travel speed of the rubber material substantially midway between the primary and secondary heating systems 8 and 9 and a second travel-speed detector 15 for monitoring a second travel speed of the rubber material just downstream of the cooling pool 10. In addition to the above, the other input terminal of the controller 5 is connected to an outside-dimension measuring device 1 disposed between a pair of roller conveyors 11 for monitoring the outside dimension of the rubber product. An optical measuring device may preferably be utilized for monitoring the outside dimension of the rubber product. Note that the output terminal of the controller 5 is connected to the microwave vulcanizer 12 for controlling the output power of microwave generated therethrough. The operation of the controller 5 is hereinafter described in detail in accordance with the flow chart of FIG. 2.

The operation of the controller 5 is started from step 1. Thereafter, step 2 proceeds wherein a measured data is read through the measuring device 1 at a preset monitoring cycle. For example, the above noted measured data could be a cross-section of the extrusion-molded rubber product, an outlet circumferential length of the product, a width of the product in cross-section, a length of the product in cross-section or the like. In the first embodiment, the measuring device 1 monitors two values, namely an outside width of the rubber product in cross-section and an outside length of the same. The controller derives the square root of the product of both width and length as the measured data.

In step 3, a test is made to determine whether the measured data is within a preset abnormal, outlying value range. When the answer to step 3 is affirmative (YES), i.e., the measured data is within the abnormal value range, step 4 proceeds wherein the current data is cancelled and thereafter step 2 proceeds again. Conversely, when the answer to step 3 is negative (NO), i.e., the measured data is out of the abnormal value range, the controller determines that the measured data is a normal measured value. Thereafter, step 5 proceeds wherein the normal measured data is stored in memories of the controller. When the number of normal measured data consecutively stored in the memories reaches a designated number, the controller derives a mean value of the designated number of consecutively stored normal measured data in step 5.

In step 6, a test is made to determine whether the mean value is within a predetermined criterion defined by designated upper and lower limits. When the answer to step 6 is affirmative, step 2 proceeds again. On the other hand, when the answer to step 6 is negative, step 7 proceeds wherein the controller derives an offset amount $\mu$ of mean value offsetting from the criterion and determines a control direction for compensating the output power of microwave generated by the microwave vulcanizer 12, so that the output power of microwave is compensated in an increased direction when the mean value is less than the lower limit of outside dimension of the product, while the output power is compensated in a decreased direction when the mean value exceeds the upper limit of the outside dimension. The offset amount $\mu$ of mean value is derived in such a manner as to select a minimum value from two absolute values, namely a first absolute value of the difference between the mean value and the upper limit and a second absolute value of the difference between the mean value and the lower limit, with the result that the selected absolute value is less than the other absolute value. This means that the output power of microwave is efficiently controlled by the controller 5 with a minimum compensated amount $\beta$.

As appreciated from steps 3 to 7, the controller 5 includes a first circuit for discriminating whether the monitored outside dimension data is within a preset abnormal, outlying value range or within a preset normal value range, and a second circuit for deriving a mean value of a designated number of consecutively monitored normal outside dimension data when the number of the consecutively monitored normal outside dimension data reaches the designated number, so as to reliably prevent malfunction of the controller 5, and an arithmetic circuit for comparing the mean value with the upper and lower limits so as to derive the offset amount of the outside dimension, offsetting from the criterion.

Subsequently, step 8 proceeds wherein the compensated amount $\beta$ of output power of microwave is determined on the basis of the selected absolute value corresponding to the offset amount $\mu$ between the mean value and either of the upper and lower limits. Thereafter, step 9 proceeds wherein the controller 5 stands by a control signal on the basis of the compensated amount $\beta$ of output power of microwave.

In the first embodiment, the above noted compensated amount $\beta$ of output power of microwave derived in the following equation.

$$\beta = (\mu \times A) + B$$

wherein, $\beta$ designates the compensated amount of output power of microwave generated by the microwave vulcanizer 12, $\mu$ designates the offset amount of the mean value, offsetting from the criterion of the outside dimension of the rubber product, and A and B designate constant values.

Thereafter, step 10 proceeds wherein a test made to determine whether or not a desired time interval is elapsed before a subsequent control signal is newly output by the controller subsequently to the previously generated control signal, so as to output the control signal at the desired time interval based on the working speed of the line. As is generally known, the travel-speed of the rubber material measured in one measuring point is considerably different from that in the other measuring point due to an unstable composition of the unfinished rubber material. Therefore, the working speed is derived on the basis of both the first and second travel-speed data respectively provided by the first and second travel-speed detectors 13 and 15.

When the answer to step 10 is affirmative, i.e., the desired time interval is not elapsed, the procedure is returned to step 2 again. Conversely, when the answer to step 10 is negative, i.e., the desired time interval is elapsed, step 11 proceeds wherein the output power of microwave generated by the microwave vulcanizer 12 is varied in response to the current control signal. The above desired time interval is determined in a manner so as to divide the distance reaching from the microwave vulcanizer 12 to the measuring device 1 by the working speed of the line and in addition to add a constant value C to the divided value.

In step 12, one cycle of the control procedure is ended and a new one cycle is started from step 1 again.

As appreciated from the procedure of step 10, a new control operation is inhibited or stopped, until the desired time interval based on the working speed is elapsed, i.e., until the measuring device 1 measures an outside dimension of the work piece affected by a varied heating temperature of the primary heating system 8 which temperature is varied due to the previous control operation.

Figure 3:
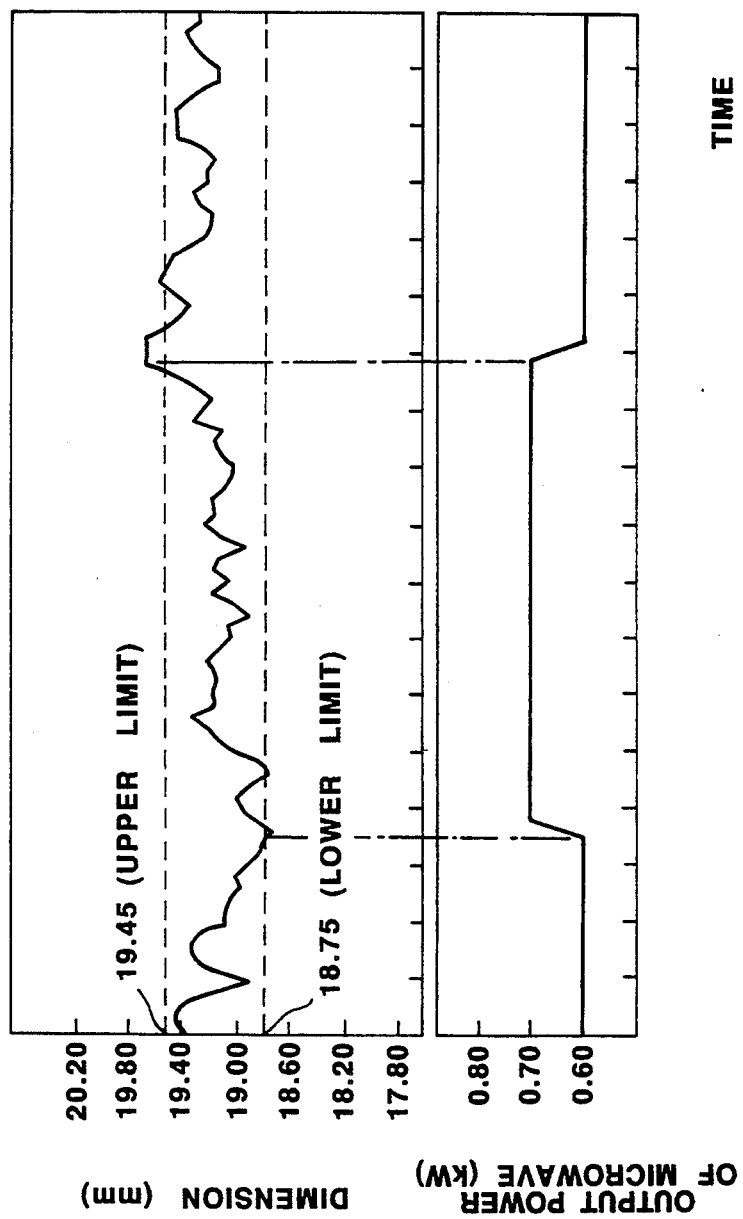
FIG. 3 is a timing chart illustrating a relationship between a controllable output power of microwave generated by a microwave vulcanizer provided in a primary heating system of the line and an actually detected outside dimension of the sponge rubber product.

FIG. 3 shows test results assured by the inventors of the present invention. In the test, 19.45 mm and 18.75 mm are used as upper and lower limits of the outside dimension of the rubber product, while the output power of microwave is varied between a maximum output power of 0.70 kw and a minimum output power of 0.60 kw. As appreciated from FIG. 3, the outside dimension of the rubber product is controlled to be kept within a predetermined criterion defined by the upper and lower limits so that the output power is increased from 0.60 kw to 0.70 kw when the outside dimension of the rubber product becomes less than the lower limit, and the output power is decreased from 0.70 kw to 0.60 kw when the outside dimension of the rubber product becomes greater than the upper limit.

As set forth above, it is advantageous to precisely maintain the outside dimension of the rubber product within an acceptable criterion, in consideration of the fact that an expansion ratio of an extrusion-molded sponge rubber product is varied due to change in a temperature-rise speed of the extrusion-molded rubber material and change in a temperature of the extrusion-molded rubber material, if a vulcanizing speed is kept constant.

In the second embodiment:

Basically, the rubber manufacturing line of the second embodiment is similar to that of the first embodiment. For the purpose to simplification of description, the same reference numerals used in the first embodiment shown in FIG. 1 will be applied to the corresponding elements used in the second embodiment shown in FIG. 4. The rubber manufacturing line of the second embodiment is different from that of the first embodiment in that the outside-dimension measuring device 1 is replaced with a temperature detecting device 14 and the first and second travel-speed detectors 13 and 15 are not utilized in the line of the second embodiment.

Figure 4:
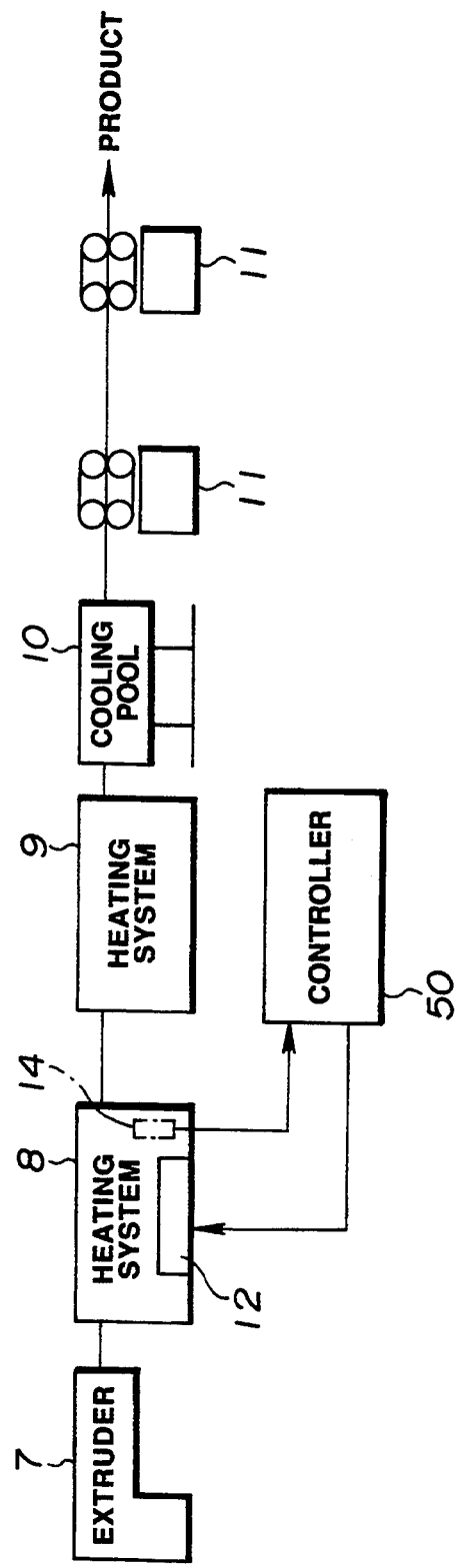
FIG. 4 is a schematic block diagram illustrating a continuous vulcanization line for manufacturing an extrusion-molded sponge rubber product, which line is automatically controlled by a controller of a second embodiment according to the invention.

Referring now to FIG. 4, there is shown another extrusion-molded rubber product manufacturing line. The line comprises an extruder 7 for pre-forming a rubber material by way of extrusion molding or pressing, a primary heating system 8 including a hot-air vulcanizer for externally heating the pre-formed rubber material to generate a pre-foamed or pre-vulcanized rubber material and a microwave vulcanizer 12 for internally heating the pre-formed rubber material, a secondary heating system 9, such as a hot-air vulcanizer or a hot-press vulcanizer for finally heating the pre-foamed rubber material foamed through the primary heating system 8, a cooling pool 10 for cooling the finally vulcanized and foamed rubber material, and first and second roller conveyors 11 provided in the vicinity of the outlet of the line, for conveying the extrusion-molded sponge rubber product. As clearly shown in FIG. 4, the controller 50 according to the invention is provided for automatically keeping the outside dimension of the rubber product within a predetermined criterion defined by designated upper and lower limits. The input terminal of the controller 50 is connected to a temperature detector 14 provided in the primary heating system 8 for monitoring a temperature in the primary heating system, whose temperature is substantially equivalent to that of the pre-foamed rubber material processed through the primary heating system 8. On the other hand, the output terminal of the controller 50 is connected to the microwave vulcanizer 12 for controlling the output of microwave generated therethrough. The operation of the controller 50 is hereinafter described in detail in accordance with the flow chart of FIG. 5.

The operation of the controller 50 is started from step 101. Thereafter, step 102 proceeds wherein a measured temperature data is read through the temperature detector 14 on the basis of a preset monitoring cycle. In the second embodiment, the inventors give attention to the fact that the temperature data correlates to the outside dimension of the extrusion-molded rubber product. As hereinafter described in detail, the controller 50 of the second embodiment is different from the controller 5 of the first embodiment in that the controller 50 determines the output power of microwave generated by the microwave vulcanizer 12 in accordance with only the temperature data derived from the temperature detector 14.

In step 103, a test is made to determine whether the measured temperature data is within a preset abnormal, outlying value range. When the answer to step 103 is affirmative, i.e., the measured temperature data is within the abnormal value range, step 104 proceeds wherein the current temperature data is cancelled and thereafter step 102 proceeds again. Conversely, when the answer to step 103 is negative, i.e., the measured temperature data is out of the abnormal value range, the controller determines that the measured temperature data is a normal measured value. Thereafter, step 105 proceeds wherein the normal measured data is stored in memories of the controller. When the number of normal measured data consecutively stored in the memories reaches a designated number, the controller derives a mean value of the designated number of consecutively stored normal measured data in step 105.

In step 106, a test is made to determine whether the mean value is within a predetermined criterion defined by designated upper and lower temperature limits. When the answer to step 106 is affirmative, step 102 proceeds again. On the other hand, when the answer to step 106 is negative, step 107 proceeds wherein the controller derives an offset amount $\mu'$ of mean value offsetting from the criterion and determines a control direction for compensating the output power of microwave generated by the microwave vulcanizer 12, so that the output power of microwave is compensated in an increased direction when the mean value is less than the lower temperature limit, while the output power is compensated in a decreased direction when the mean value exceeds the upper temperature limit. The offset amount $\mu'$ of mean value is derived in such a manner as to select a minimum value from two absolute values, namely a first absolute value of the difference between the mean value and the upper temperature limit and a second absolute value of the difference between the mean value and the lower temperature limit, with the result that the selected absolute value is less than the other absolute value. This means that the output power of microwave is efficiently controlled by the controller 50 with a minimum compensated amount $\beta'$.

As appreciated from steps 103 to 107, the controller 50 includes a first circuit for discriminating whether the monitored temperature data is within a preset abnormal, outlying temperature range or within a preset normal temperature range, and a second circuit for deriving a mean value of a designated number of consecutively monitored normal temperature data when the number of the consecutively monitored normal temperature data reaches the designated number, so as to reliably avoid malfunction of the controller 50, and an arithmetic circuit for comparing the mean value with the upper and lower temperature limits so as to derive the offset amount of the temperature, offsetting from the criterion.

Subsequently, step 108 proceeds wherein the compensated amount $\beta'$ of output power of microwave is determined on the basis of the selected absolute value corresponding to the offset amount $\mu'$ between the mean value and either of the upper and lower limits.

In the second embodiment, the above noted compensated amount $\beta'$ of output power of microwave is derived in the following equation.

$$\beta' = (\mu' \times A') + B'$$

wherein, $\beta$ designates the compensated amount of output power of microwave generated by the microwave vulcanizer 12, $\mu$ designates the offset amount of the mean value, offsetting from the criterion of the temperature detected in the primary heating system 8, and $A'$ and $B'$ designate constant values.

Thereafter, step 109 proceeds wherein the controller 50 stands by a control signal on the basis of the compensated amount $\beta$ of output power of microwave and generates the control signal to the microwave vulcanizer 12. In this manner, the output power of microwave is suitably varied and compensated in response to the control signal in step 110. In step 111, one cycle of the control procedure is ended and a new control cycle is started from step 101 again.

Since the upper and lower temperature limits utilized in the second embodiment are experimentally determined correlatively to acceptable upper and lower limits of the outside dimension of the rubber product, it is advantageous to utilize only a temperature detected in a primary heating system as a control parameter for an acceptable outside dimension of the rubber product.

Furthermore, since the control operation according to the second embodiment does not require the inhibiting procedure of step 10 wherein a new control operation is inhibited until the desired time interval based on the working speed is elapsed, the control operation of the second embodiment is repeated at a preset monitoring cycle. Therefore, the second embodiment can provide a higher responsibility of the outside-dimension control of the rubber product than that of the first embodiment.

As set forth above, since an expansion ratio of an extrusion-molded sponge rubber product is automatically controlled by varying an output power of microwave generated by a microwave vulcanizer included in a primary heating system, the controller according to the invention facilitates production of a complicated extrusion-molded sponge rubber, such as an automotive weatherstrip.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. A control system for automatically controlling a continuous vulcanization line for sponge rubber materials comprising:

an extruder for pre-forming said sponge rubber material;

a primary heating means arranged downstream of said extruder for primary heating of the pre-formed sponge rubber material:

a secondary heating means for finally heating the sponge rubber material downstream of said primary heating means;

sensor means for monitoring a temperature in said primary heating means;

discrimination means for determining whether said monitored temperature is within a predetermined criterion defined by designated upper and lower temperature limits whose limits correlate to upper and lower limits of an outside dimension of an acceptable sponge rubber product;

arithmetic means for deriving an offset temperature of said monitored temperature, offsetting from said criterion, to generate an offset temperature indicative signal;

said primary heating means including a microwave generating means for internally heating the pre-formed sponge rubber material; and control means for controlling an output power of microwave generated by said microwave generating means, in response to said offset temperature indicative signal, such that the output power of said microwave generating means is increased to increasingly compensate an expansion ratio of the pre-formed sponge rubber material when the monitored temperature is less than said lower temperature limit and that the output power of said microwave generating means is decreased to decreasingly compensate said expansion ratio when the monitored temperature exceeds said upper temperature limit.

2. The control system, as set forth in claim 1, wherein said microwave generating means is comprised of a microwave vulcanizer for internally heating said pre-formed rubber material.

3. The control system as set forth in claim 1, wherein said control means controls the ,output power of microwave such that the output power is linearly increased in proportion to said offset temperature when said monitored temperature is less than said lower temperature limit and the output power is linearly decreased in proportion to said offset temperature when said monitored temperature exceeds said upper temperature limit.

4. The control system as set forth in claim 1, wherein said discrimination means includes a first circuit for discriminating whether said monitored temperature data is within a preset abnormal, outlying temperature range or within a preset normal temperature range, and a second circuit for deriving a mean value of a designated number of consecutively monitored normal temperature data when the number of the consecutively monitored normal temperature data reaches said designated number, to prevent malfunction of said control system, and said arithmetic means compares said mean value with said upper and lower temperature limits so as to derive said offset amount of said temperature, offsetting from said criterion.

* * * * *